(12) United States Patent
Akash et al.

(10) Patent No.: US 12,145,599 B2
(45) Date of Patent: Nov. 19, 2024

(54) SYSTEMS AND METHODS FOR CLUSTERING HUMAN TRUST DYNAMICS

(71) Applicant: Honda Motor Co., Ltd., Tokyo (JP)

(72) Inventors: Kumar Akash, Milpitas, CA (US); Teruhisa Misu, San Jose, CA (US); Xingwei Wu, Sunnyvale, CA (US); Jundi Liu, Seattle, WA (US)

(73) Assignee: HONDA MOTOR CO., LTD., Tokyo (JP)

( * ) Notice: Subject to any disclaimer, the term of this patent is extended or adjusted under 35 U.S.C. 154(b) by 301 days.

(21) Appl. No.: 17/687,521

(22) Filed: Mar. 4, 2022

(65) Prior Publication Data
US 2022/0396273 A1 Dec. 15, 2022

Related U.S. Application Data

(60) Provisional application No. 63/209,383, filed on Jun. 10, 2021.

(51) Int. Cl.
*B60W 40/09* (2012.01)
*B60W 60/00* (2020.01)

(52) U.S. Cl.
CPC ........ *B60W 40/09* (2013.01); *B60W 60/0013* (2020.02); *B60W 2540/22* (2013.01);
(Continued)

(58) Field of Classification Search
CPC ............. B60W 40/09; B60W 60/0013; B60W 2540/22; B60W 2554/4029;
(Continued)

(56) References Cited

U.S. PATENT DOCUMENTS

2020/0283002 A1* 9/2020 Gupta ............. G08G 1/096741

OTHER PUBLICATIONS

K. Akash, W.-L. Hu, N. Jain, and T. Reid, "A classification model for sensing human trust in machines using eeg and gsr," ACM Transactions on Interactive Intelligent Systems (TiiS), vol. 8, No. 4, pp. 1-20, 2018.
(Continued)

*Primary Examiner* — Yuen Wong
(74) *Attorney, Agent, or Firm* — RANKIN, HILL & CLARK LLP

(57) ABSTRACT

Systems and methods for clustering human trust dynamics are provided. In one embodiment, a computer implemented method for clustering human trust dynamics is provided. The computer implemented method includes receiving trust data for a plurality of participants interacting with one or more agents in an interaction. The computer implemented method also includes identifying a plurality of phases for the interaction. The computer implemented method further includes extracting features characterizing trust dynamics from the trust data for at least one interaction for each participant of the plurality participants. The at least one interaction is between the participant and an agent of the one or more agents. The computer implemented yet further includes assigning the features characterizing trust dynamics to a phase of the plurality of phases. The computer implemented method includes grouping a subset of the participant of the plurality of participants based on the on features characterizing trust dynamics.

20 Claims, 9 Drawing Sheets

(52) U.S. Cl.
CPC ............... *B60W 2554/4029* (2020.02); *B60W 2554/4049* (2020.02)

(58) Field of Classification Search
CPC .. B60W 2554/4049; B60W 2040/0872; G06V 20/54; G06V 10/763; G06V 10/774; G06V 10/778; G06V 20/53
See application file for complete search history.

(56) References Cited

OTHER PUBLICATIONS

K. Akash, N. Jain, and T. Misu, "Toward adaptive trust calibration for level 2 driving automation," in Proceedings of the 2020 International Conference on Multimodal Interaction, 2020, pp. 538-547.
K. Akash, G. McMahon, T. Reid, and N. Jain, "Human trust-based feedback control: Dynamically varying automation transparency to optimize human-machine interactions," IEEE Control Systems Magazine, vol. 40, No. 6, pp. 98-116, 2020.
I. Assent, "Clustering high dimensional data," Wiley Interdisciplinary Reviews: Data Mining and Knowledge Discovery, vol. 2, No. 4, pp. 340-350, 2012.
H. Azevedo-Sa, S. K. Jayaraman, C. T. Esterwood, X. J. Yang, L. P. Robert, and D. M. Tilbury, "Real-time estimation of drivers' trust in automated driving systems," International Journal of Social Robotics, pp. 1-17, 2020.
S. M. Casner, E. L. Hutchins, and D. Norman, "The challenges of partially automated driving," Communications of the ACM, vol. 59, No. 5, pp. 70-77, 2016.
M. Chen, S. Nikolaidis, H. Soh, D. Hsu, and S. Srinivasa, "Planning with Trust for Human-Robot Collaboration," in Proceedings of the 2018 ACM/IEEE International Conference on Human-Robot Interaction—HRI '18. Chicago, IL, USA: ACM Press, 2018, pp. 307-315.
E. J. de Visser, M. Cohen, A. Freedy, and R. Parasuraman, "A design methodology for trust cue calibration in cognitive agents," in International conference on virtual, augmented and mixed reality. Springer, 2014, pp. 251-262.
P. de Vries, C. Midden, and D. Bouwhuis, "The effects of errors on system trust, self-confidence, and the allocation of control in route planning," vol. 58, No. 6, pp. 719-735, Jun. 2003.
M. Dikmen and C. Burns, "Trust in autonomous vehicles: The case of tesla autopilot and summon," in 2017 IEEE International Conference on Systems, Man, and Cybernetics (SMC). IEEE, 2017, pp. 1093-1098.
K. Drnec and J. S. Metcalfe, "Paradigm Development for Identifying and Validating Indicators of Trust in Automation in the Operational Environment of Human Automation Integration," in Foundations of Augmented Cognition: Neuroergonomics and Operational Neuroscience, D. D. Schmorrow and C. M. Fidopiastis, Eds. Switzerland: Springer International Publishing, 2016, vol. 9744, pp. 157-167.
S. Elmalaki, H.-R. Tsai, and M. Srivastava, "Sentio: Driver-in-the-loop forward collision warning using multisample reinforcement learning," in Proceedings of the 16th ACM Conference on Embedded Networked Sensor Systems, 2018, pp. 28-40.
E. ElSalamouny, V. Sassone, and M. Nielsen, "HMM-based trust model," in International Workshop on Formal Aspects in Security and Trust. Springer, Berlin, Heidelberg, 2009, pp. 21-35.
M. R. Endsley, "From here to autonomy: lessons learned from human-automation research," Human factors, vol. 59, No. 1, pp. 5-27, 2017.
U. Z. A. Hamid, F. R. A. Zakuan, K. A. Zulkepli, M. Z. Azmi, H. Zamzuri, M. A. A. Rahman, and M. A. Zakaria, "Autonomous emergency braking system with potential field risk assessment for frontal collision mitigation," in 2017 ieee conference on systems, process and control (icspc). IEEE, 2017, pp. 71-76.

M. Hengstler, E. Enkel, and S. Duelli, "Applied artificial intelligence and trust—the case of autonomous vehicles and medical assistance devices," Technological Forecasting and Social Change, vol. 105, pp. 105-120, 2016.
S. Hergeth, L. Lorenz, J. F. Krems, and L. Toenert, "Effects of takeover requests and cultural background on automation trust in highly automated driving," in Proceedings of the Eighth International Driving Symposium on Human Factors in Driver Assessment, Training and Vehicle Design. Salt Lake City, Utah, USA: University of Iowa, 2015, pp. 331-337.
K. A. Hoff and M. Bashir, "Trust in automation: Integrating empirical evidence on factors that influence trust," Human factors, vol. 57, No. 3, pp. 407-434, 2015.
W. Hu, K. Akash, T. Reid, and N. Jain, "Computational Modeling of the Dynamics of Human Trust During Human-Machine Interactions," IEEE Transactions on Human-Machine Systems, pp. 1-13, 2018.
J.-Y. Jian, A. M. Bisantz, and C. G. Drury, "Foundations for an empirically determined scale of trust in automated systems," International journal of cognitive ergonomics, vol. 4, No. 1, pp. 53-71, 2000.
M. Kuderer, S. Gulati, and W. Burgard, "Learning driving styles for autonomous vehicles from demonstration," in 2015 IEEE International Conference on Robotics and Automation (ICRA). IEEE, 2015, pp. 2641-2646.
J. D. Lee and K. Kolodge, "Exploring trust in self-driving vehicles through text analysis," Human factors, vol. 62, No. 2, pp. 260-277, 2020.
J. D. Lee and K. A. See, "Trust in automation: Designing for appropriate reliance," Human factors, vol. 46, No. 1, pp. 60-80, 2004.
D. V. McGehee, M. Brewer, C. Schwarz, B. W. Smith, et al., "Review of automated vehicle technology: policy and Implementation implications." Iowa. Dept. of Transportation, Tech. Rep., 2016.
J. S. Metcalfe, A. R. Marathe, B. Haynes, V. J. Paul, G. M. Gremillion, K. Drnec, C. Atwater, J. R. Estepp, J. R. Lukos, E. C. Carter, and W. D. Nothwang, "Building a framework to manage trust in automation," in Micro- and Nanotechnology Sensors, Systems, and Applications IX, vol. 10194, May 2017, p. 101941U.
J. E. Mercado, M. A. Rupp, J. Y. Chen, M. J. Barnes, D. Barber, and K. Procci, "Intelligent agent transparency in human-agent teaming for multi-uxv management," Human factors, vol. 58, No. 3, pp. 401-415, 2016.
S. M. Merritt and D. R. Ilgen, "Not all trust is created equal: Dispositional and history-based trust in human-automation Interactions," Human Factors, vol. 50, No. 2, pp. 194-210, 2008.
M. E. G. Moe, M. Tavakolifard, and S. J. Knapskog, "Learning trust in dynamic multiagent environments using HMMs," in Proceedings of the 13th Nordic Workshop on Secure IT Systems (NordSec 2008), 2008.
N. Moray, T. Inagaki, and M. Itoh, "Adaptive automation, trust, and self-confidence in fault management of time-critical tasks," Journal of Experimental Psychology: Applied, vol. 6, No. 1, pp. 44-58, 2000.
L. Morra, F. Lamberti, F. G. Prattic'o, S. La Rosa, and p. Montuschi, "Building trust in autonomous vehicles: role of virtual reality driving simulators in hmi design," IEEE Transactions on Vehicular Technology, vol. 68, No. 10, pp. 9438-9450, 2019.
B. M. Muir, "Trust in automation: Part i. theoretical issues in the study of trust and human intervention in automated systems," Ergonomics, vol. 37, No. 11, pp. 1905-1922, 1994.
B. M. Muir and N. Moray, "Trust in automation. Part II. Experimental studies of trust and human intervention in a process control simulation," Ergonomics, vol. 39, No. 3, pp. 429-460, 1996.
D. Niu, J. Terken, and B. Eggen, "Anthropomorphizing information to enhance trust in autonomous vehicles," Human Factors and Ergonomics in Manufacturing & Service Industries, vol. 28, No. 6, pp. 352-359, 2018.
B. E. Noah and B. N. Walker, "Trust calibration through reliability displays in automated vehicles," in Proceedings of the Companion of the 2017 ACM/IEEE International Conference on Human-Robot Interaction, 2017, pp. 361-362.

(56) References Cited

OTHER PUBLICATIONS

K. Raats, V. Fors, and S. Pink, "Understanding trust in automated vehicles," in Proceedings of the 31st Australian Conference on Human-Computer-Interaction, 2019, pp. 352-358.

J. B. Rotter, "A new scale for the measurement of interpersonal trust," Journal of Personality, vol. 35, No. 4, pp. 651-665, 1967.

J. B. Rotter, "Generalized expectancies for interpersonal trust," American Psychologist, vol. 26, No. 5, pp. 443-452, 1971.

J. B. Rotter, "Interpersonal trust, trustworthiness, and gullibility," American Psychologist, vol. 35, No. 1, pp. 1-7, 1980.

P. A. Ruijten, J. Terken, and S. N. Chandramouli, "Enhancing trust in autonomous vehicles through intelligent user interfaces that mimic human behavior," Multimodal Technologies and Interaction, vol. 2, No. 4, p. 62, 2018.

K. E. Schaefer, J. Y. Chen, J. L. Szalma, and P. A. Hancock, "A metaanalysis of factors influencing the development of trust in automation: Implications for understanding autonomy in future systems," Human factors, vol. 58, No. 3, pp. 377-400, 2016.

S. Sheng, E. Pakdamanian, K. Han, B. Kim, p. Tiwari, I. Kim, and L. Feng, "A case study of trust on autonomous driving," in 2019 IEEE Intelligent Transportation Systems Conference (ITSC). IEEE, 2019, pp. 4368-4373.

K. Sommer, "Continental mobility study 2011," Continental AG, pp. 19-22, 2013.

P. Wintersberger, A.-K. Frison, A. Riener, and L. N. Boyle, "Towards a personalized trust model for highly automated driving," Mensch und Computer 2016—Workshopband, 2016.

A. Xu and G. Dudek, "OPTIMo: Online Probabilistic Trust Inference Model for Asymmetric Human-Robot Collaborations," in Proceedings of the Tenth Annual ACM/IEEE International Conference on Human-Robot Interaction, ser. HRI '15. New York, NY, USA: ACM, 2015, pp. 221-228.

X. J. Yang, V. V. Unhelkar, K. Li, and J. A. Shah, "Evaluating effects of user experience and system transparency on trust in automation," in 2017 12th ACM/IEEE International Conference on Human-Robot Interaction (HRI. IEEE, 2017, pp. 408-416.

* cited by examiner

SYSTEMS AND METHODS FOR CLUSTERING HUMAN TRUST DYNAMICS

BACKGROUND

Automation technologies using automated agents, such as autonomous vehicles, have significant benefits for society. For example, the use of autonomous vehicles has been shown to increase mobility and road efficiency, as well as resulting in better utilization of parking areas. Automated agents may also improve the experience and comfort of human participants. However, acceptance of the automation technologies does not keep up with the fast-growing market penetration. For example, in a 2013 survey, 66% of U.S. respondents indicated they were "scared" by the concept of automated driving, and more than half of respondents were skeptical of the reliability of the technology. Accordingly, despite the benefits of automation technologies, public trust has emerged as a relevant focus.

BRIEF DESCRIPTION

According to one aspect, a computer implemented method for clustering human trust dynamics is provided. The computer implemented method includes receiving trust data for a plurality of participants interacting with one or more agents in an interaction. The computer implemented method also includes identifying a plurality of phases for the interaction. The computer implemented method further includes extracting features characterizing trust dynamics from the trust data for at least one interaction for each participant of the plurality participants. The at least one interaction is between the participant and one agent of the one or more agents. The computer implemented yet further includes assigning the features characterizing trust dynamics to phases of the plurality of phases. The computer implemented method includes grouping a subset of the participants of the plurality of participants into a trust group based on the on features characterizing trust dynamics.

According to another aspect, a system for clustering human trust dynamics is provided. The system includes a memory storing instructions that when executed by a processor cause the processor to perform a method. The instructions cause the processor to receive trust data for a plurality of participants interacting with one or more agents in an interaction. The instructions also cause the processor to identify a plurality of phases for the interaction. The instructions further cause the processor to extract features characterizing trust dynamics from the trust data for at least one interaction for each participant of the plurality participants. The at least one interaction is between the participant and one agent of the one or more agents. The instructions yet further cause the processor to assign the features characterizing trust dynamics to phases of the plurality of phases. The instructions cause the processor to group a subset of the participants of the plurality of participants into a trust group based on the on features characterizing trust dynamics.

According to yet another aspect, a non-transitory computer readable storage medium storing instructions that when executed by a computer having a processor to perform a method for clustering human trust dynamics is provided. The non-transitory computer readable storage medium implemented method includes receiving trust data for a plurality of participants interacting with one or more agents in an interaction. The non-transitory computer readable storage medium implemented method also includes identifying a plurality of phases for the interaction. The non-transitory computer readable storage medium implemented method further includes extracting features characterizing trust dynamics from the trust data for at least one interaction for each participant of the plurality participants. The at least one interaction is between the participant and one agent of the one or more agents. The non-transitory computer readable storage medium implemented method yet further includes assigning the features characterizing trust dynamics to phases of the plurality of phases. The non-transitory computer readable storage medium implemented method includes grouping a subset of the participants of the plurality of participants into a trust group based on the on features characterizing trust dynamics.

DETAILED DESCRIPTION

Figure 1:
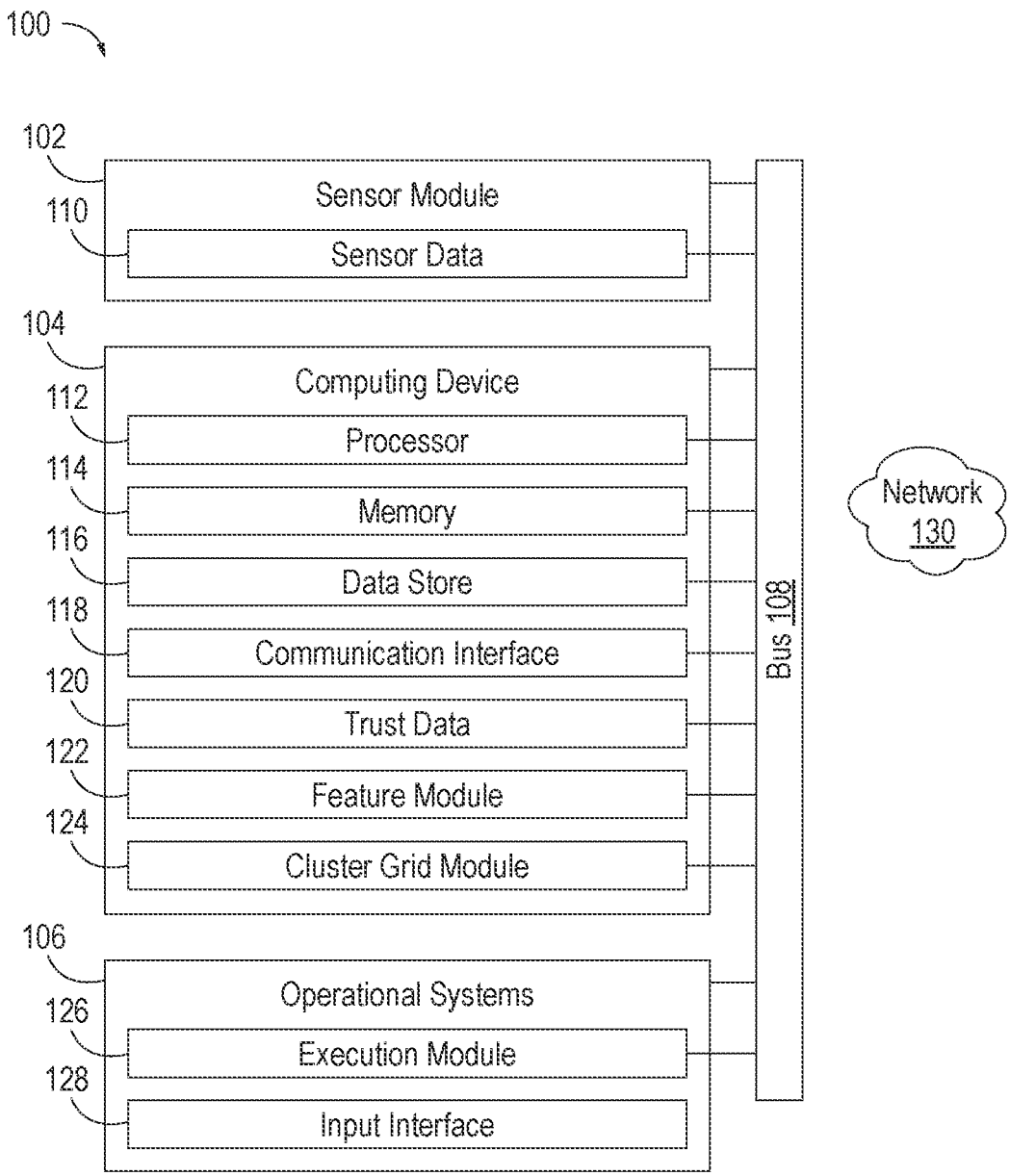
FIG. 1 is an exemplary component diagram of a system for clustering human trust dynamics, according to one aspect.

To improve public acceptance of automation technologies using automated agents, studies have attempted to predict the level of trust that a human participant has in an agent, such as an autonomous vehicle. Trust is the reflection of the belief of a human participant that the agent will help the human participant achieve a goal in an interaction that is characterized by uncertainty or vulnerability. The level of trust that a human participant has in automated agents is highly relevant because human participants change how they behave in the presence of agents depending on their level of trust in agents. Accordingly, when operating in an environment with human participants, agents may attempt to determine the level of trust of human participants in order to predict the behavior of the human participants.

Paradigms that anticipate human behaviors, such as trust, are difficult to quantitatively predict. Typically, questionnaires have been used to measure the trust levels of human participants before, during, or after an interaction with an agent. Although the questionnaire allows the human participant to self-report a trust level, it is challenging to obtain self-reports repeatedly without interrupting the task and may be dangerous, for example during an autonomous driving operation, if the human participant becomes distracted.

Dynamic models to capture human trust have been developed including a general trust model for the whole population and a personalized trust model for each individual to account for individual differences. The general trust model ignores individual differences but may be trained using limited data. Alternatively, a personalized trust model is designed for a particular person, but requires a significant amount of data for each new user and cannot be collected in a short time period. Therefore, a tradeoff exists between limiting the amount of data needed for model training and improvement in model performance by personalization.

Here, clustering methods are used to identify and separate different trust dynamics across a sample population of human participants. Customized trust models are developed for each grouping of the population that account for broad individual differences in trust dynamics but allows model development with limited data. The groupings may be dynamic and represent changes in trust levels of the human participants in a given trust group. Features relevant to the level of trust of the human participants may be extracted. Time dependent characteristics of the features are considered by assigning the features to phases corresponding to different phases of the interaction. In this manner, trust groups of participants may be identified based on differences in trust dynamics of the features using clustering based on trust evolution. An agent may modify its behavior based on the trust group of a given human participant. For example, a trust group may be associated with a behavior model that predicts the behavior of the human participant. The agent may then interact with the human participant based on the predicted behavior. Accordingly, the agent can tailor its automated operations based on the trust group of the participant.

The clustered models significantly outperform the general model in predicting human trust as well as the behavior of a human participant. Additionally, although demographic factors have significant contributions to individual differences, clustering based on trust dynamics-based features is more effective than simple demographic factor-based clustering for trust behavior prediction. This allows the agent itself to function better as the agent can select actions based on the predicted actions of the human participant. Thus, the agent is not unknowingly working against or in spite of the human participant. This not only improves the experience of the human participant but also improves the automation of the agent. Accordingly, the systems and methods described herein improve the experience and comfort of human participants in interaction with agents by clustering human participants in trust groups that balance the amount of data needed for model training and performance by personalization.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein are machines that move through or manipulate an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, and/or propulsion. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. Further, the term "vehicle" may refer to an electric vehicle (EV) that is powered entirely or partially by one or more electric motors powered by an electric battery. The EV may include battery electric vehicles and plug-in hybrid electric vehicles (PHEV). The term "vehicle" may also refer to an autonomous vehicle and/or self-driving vehicle powered by any form of energy.

I. System Overview

Referring now to the drawings, the drawings are for purposes of illustrating one or more exemplary embodiments and not for purposes of limiting the same. FIG. 1 is an exemplary component diagram of an operating environment 100 for clustering human trust dynamics, according to one aspect.

The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 2A:
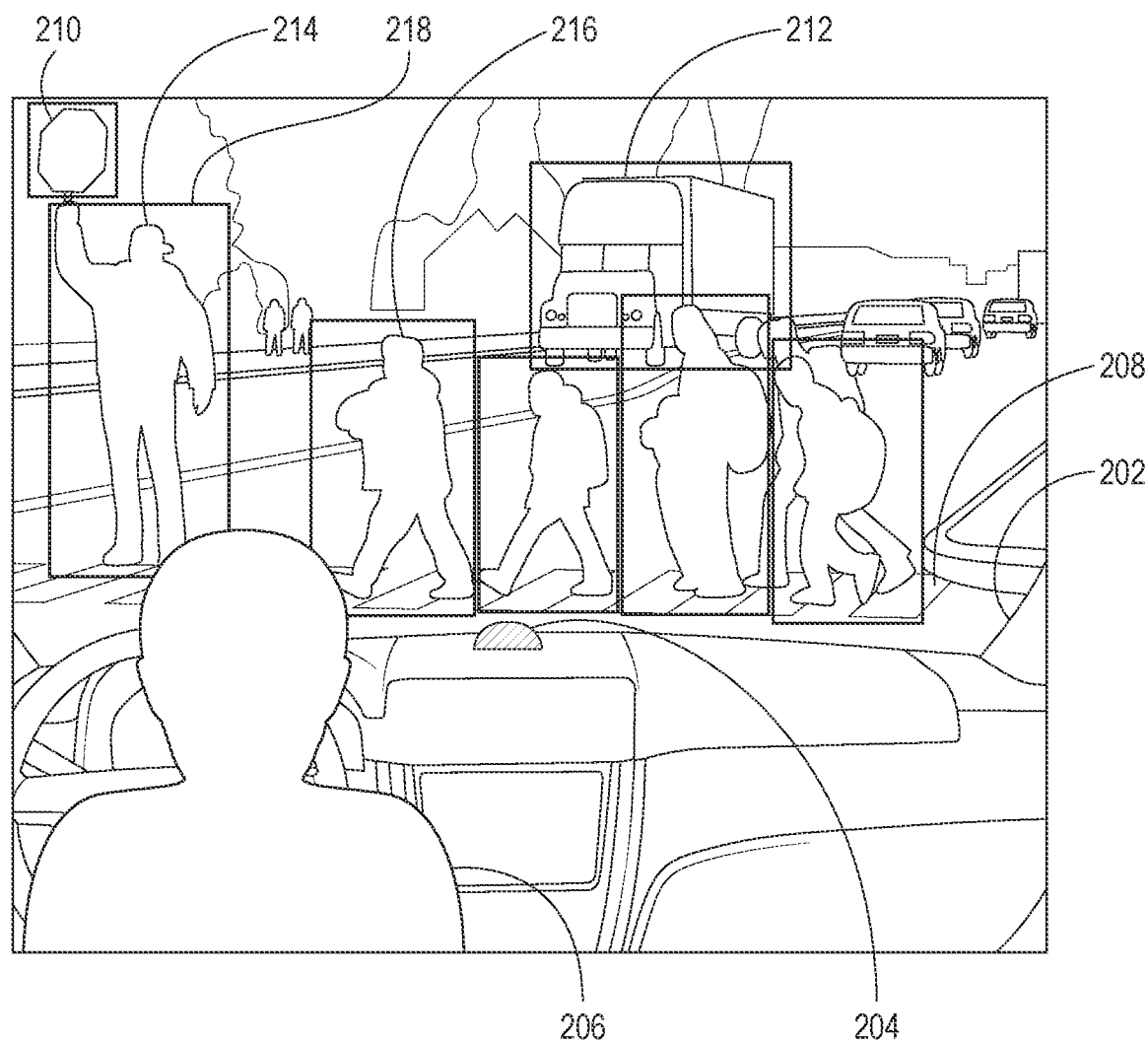
FIG. 2A is an exemplary agent environment with high visibility and high transparency, according to one aspect.
Figure 2B:
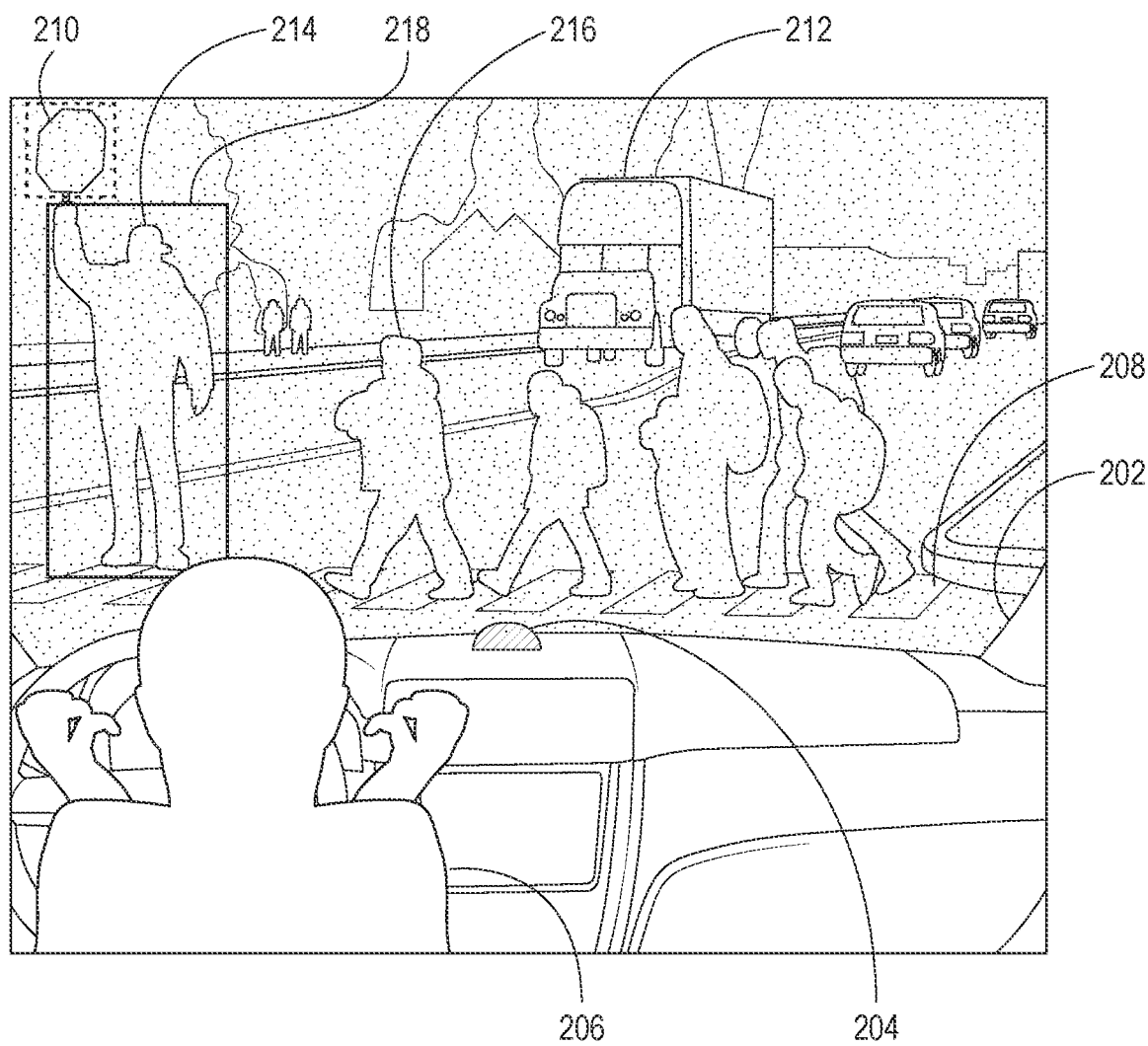
FIG. 2B is an exemplary agent environment with high visibility and low transparency, according to one aspect.
Figure 2C:
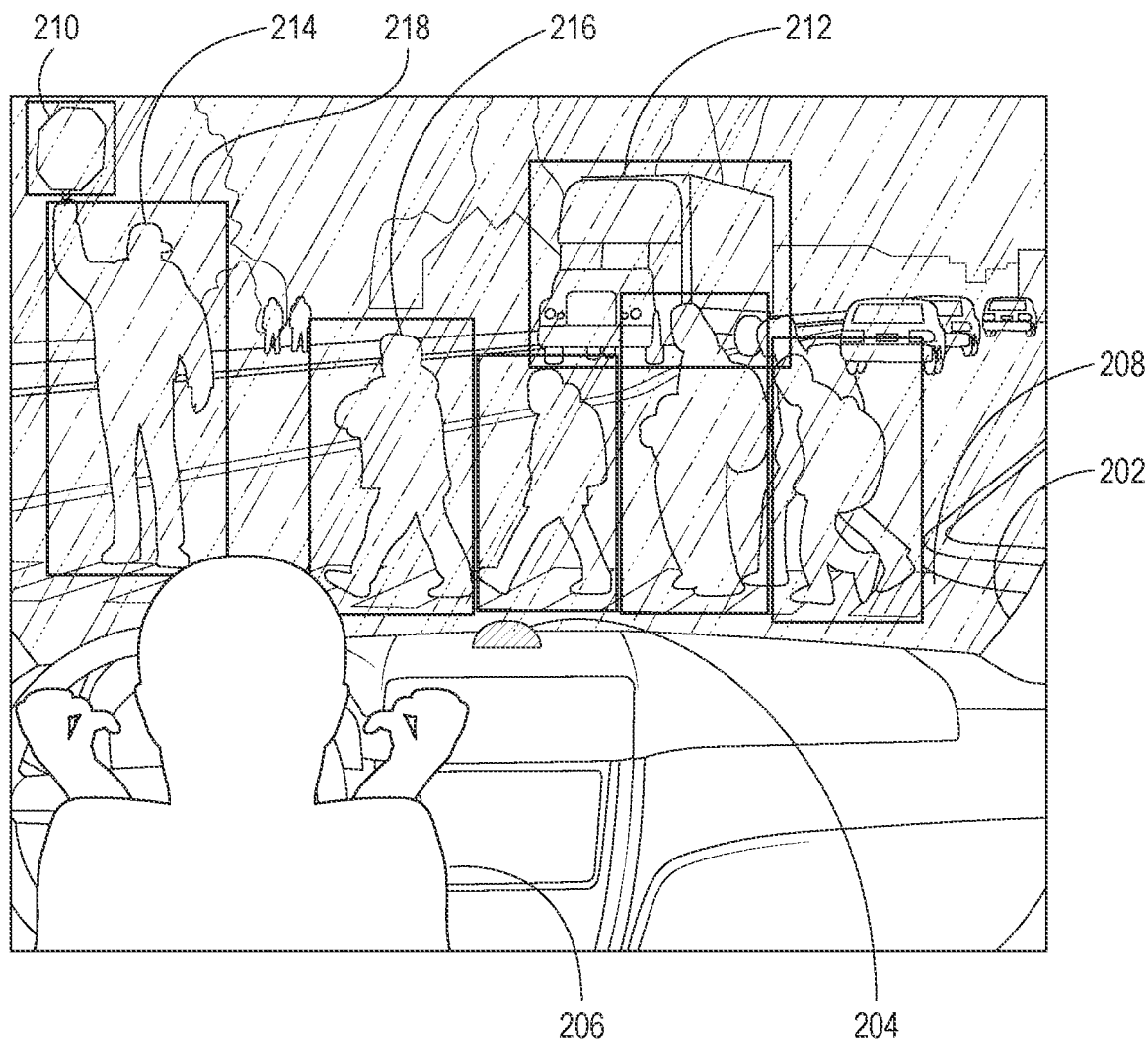
FIG. 2C is an exemplary agent environment with low visibility and high transparency, according to one aspect.

The computing device 104 may be implemented as a part of an agent, such as the agent 202 of the environment 200, shown in FIGS. 2A-2C. The agent 202 may be a bipedal, two-wheeled, four-wheeled robot, a vehicle, or a self-propelled machine. In another embodiment, the agent 202 may be configured as a humanoid robot. The agent 202 may take the form of all or a portion of a robot. The computing device 104 may be implemented as part of a telematics unit, a head unit, a navigation unit, an infotainment unit, an electronic control unit, among others of the agent 202. In other embodiments, the components and functions of the computing device 104 may be implemented with other devices (e.g., a portable device) or another device connected via a network (e.g., a network 130).

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The agent 202 may include sensors for sensing objects and the environment 200. For example, the agent 202 may include a sensor 204. The sensor 204 may be an image sensor or a light sensor to capture light data from around the agent 202. For example, a light sensor may rotate 360 degrees around agent 202 and collect the sensor data 110 in sweeps. Conversely, an sensor 204 may be omnidirectional and collect sensor data 110 from all directions simultaneously. The sensor 204 of an agent may emit one or more laser beams of ultraviolet, visible, or near infrared light toward the surrounding environment of the agent 202.

In another embodiment, the sensor 204 may be a biometric sensor that monitors biometric data of human participants, such as a human participant 206. For example, in the vehicular embodiment, the sensor 204 may monitor the human participant 206 associated with a vehicle, such as a driver of a vehicle, for one or more vital signs or characteristics. For example, the sensor 204 may measure a body temperature, a pulse, a pulse rate or heart rate, a respiration rate, perspiration rate, a blood pressure, eye movement, body movement, head movement, carbon dioxide output, or other biometric or functional aspects of a human participant 206. The biometric data may also include demographic information of the participant 206, such as the age, gender, ethnicity, race, highest level of education, income level, employment status, job title, housing status, address, etc.

The sensor 204 may be positioned on the agent 202. For example, suppose that the agent 202 is a vehicle, one more sensors may be positioned at external front and/or side portions of the agent 202, including, but not limited to different portions of the vehicle bumper, vehicle front lighting units, vehicle fenders, and the windshield. Additionally, the sensors may be disposed at internal portions of the agent 202 including, in a vehicular embodiment, the vehicle dashboard (e.g., dash mounted camera), rear side of a vehicle rear view mirror, etc. Sensors may be positioned on a planar sweep pedestal (not shown) that allows the sensor 204 to be rotated to capture images of the environment at various angles.

The sensors, such as the sensor 204, and/or the sensor module 102 are operable to sense a measurement of data associated with the agent 202, the operating environment 100, the environment 200, and/or the operational systems 106 and generate a data signal indicating said measurement of data. These data signals may be converted into other data formats (e.g., numerical) and/or used by the sensor module 102, the computing device 104, and/or the operational systems 106 to generate sensor data 110 including data metrics and parameters. The sensor data 110 may be received by the sensor module as an input image. Based on the location of the sensor 204, the input image may be a perspective space image defined relative to the position and viewing direction of the agent 202.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes a trust data module 120, a feature module 122, and a cluster module 124 for clustering human trust dynamics facilitated by the components of the operating environment 100.

The trust data module 120, the feature module 122, and/or the cluster module 124, may be artificial neural networks that act as a framework for machine learning, including deep reinforcement learning. For example, the trust data module 120, the feature module 122, and/or the cluster module 124 may be a convolution neural network (CNN). In one embodiment, the trust data module 120, the feature module 122, and/or the cluster module 124 may include a conditional generative adversarial network (cGAN). One or more of the trust data module 120, the feature module 122, and the cluster module 124 may include an input layer, an output layer, and one or more hidden layers, which may be convolutional filters. In some embodiments, one or more of the modules may include Long Short Term Memory (LSTM) networks and LSTM variants (e.g., E-LSTM, G-LSTM, etc.).

The computing device 104 is also operably connected for computer communication (e.g., via the bus 108 and/or the communication interface 118) to one or more operational systems 106. The operational systems 106 may include, but are not limited to, any automatic or manual systems that may be used to enhance the agent 202, and/or operation. The operational systems 106 include an execution module 126 and an input interface 128.

The execution module 126 monitors, analyses, and/or operates the agent 202, to some degree. For example, the execution module 126 may store, calculate, and provide directional information and facilitates features like vectoring and obstacle avoidance among others. In a vehicular embodiment, the execution module 126 may provide operational data to agent systems, such as the steering system, that cause the agent 202 to operate autonomously. In some embodiments, the execution module 126 may be a Proportional, Integral, Derivative (PID) controller. Continuing the vehicular embodiment described above, the execution module 126 may be a longitudinal PID controller. The operational systems 106 may dependent on the implementation.

The execution module 126 may monitor and assist in interactions between the agent 202 and the participant 206, such as facilitating a hand off between the agent 202 and the participant 206. For example, in the vehicular embodiment, the agent 202 may operate autonomously, functionality, and/or control to perform functions without the influence or action of the participant 206. When the participant 206 wishes to take over control of the agent 202, the participant 206 may provide the agent 202 a participant input that will be described in greater detail below. After the hand-off, the agent 202 operates only based on the actions of the participant 206. In response to the participant inupt, the execution module 126 facilitates initiating a hand-off from the agent 202 to the participant 206. In one embodiment, initiating the hand-off may include alerting participant 206 with a hand-off alert. The hand-off alert may prompt the participant to confirm the participant 206 will be operating the agent 202. As another example, the operational systems 106 may include a brake system (not shown), that monitors, analyses, and calculates braking information and facilitates features like anti-lock brake system, a brake assist system, etc.

The operational systems 106 may utilize a input interface 128. The user interface may include an input portion. The input interface 128 may receive one or more user inputs from one or more human participants, which may include passengers, drivers, occupants, operators, etc. of a vehicle via the input portion. The input portion of the input interface 128 may enable a human participant, such as a driver or occupant, to interact with or provide input, such as user input, gestures, clicks, points, selections, voice commands, etc.

As an example, the input portion of the input interface 128 may be implemented as a display portion. The display portion may include a touch screen, a touchpad, a track pad, one or more hardware buttons (e.g., on a radio or a steering wheel), one or more buttons, such as one or more soft buttons, one or more software buttons, one or more interactive buttons, one or more switches, a keypad, a microphone, one or more sensors, etc. In one or more embodiments, the input interface 128 may be implemented in a manner which integrates the display portion such that the input interface 128 both provides an output (e.g., renders content as the display portion) and receives inputs (e.g., participant inputs). Other examples of input portions may include a microphone for capturing voice input from the participant 206.

The input interface 128 may receive a variety of participant inputs, such as verbal commands, spoken commands (e.g., utilizing a microphone or audio sensor), pressing of buttons, activating switches, gesture inputs, such as a swipe, a multi-finger swipes, a pinch and zoom, a touch (e.g., utilizing a touch screen), a press (e.g., via pressure sensors), a press and hold, a selection, a movement of a cursor, a click (e.g., utilizing a button, mouse button, a hardware button, a soft button, a software button, track button), etc. In this way, the input interface 128 may receive one or more participant inputs, such as from the participant 206: driver, passenger, or other human participant interacting with the agent 202.

The operational systems 106 also include and/or are operably connected for computer communication to the sensor module 102. For example, one or more sensors of the sensor module 102, such as the sensor 204, may be incorporated with execution module 126 to monitor characteristics of the environment of the agent 202 or the agent 202 itself. For example, in the vehicular embodiment, the sensor 204 may be incorporated with execution module 126 to monitor characteristics of the environment 200. Suppose that the execution module 126 is facilitating execution of a right turn onto a street. The execution module 126 may receive sensor data 110 from the sensor module 102 to confirm that vehicles present on the street are yielding as expected.

The sensor module 102, the computing device 104, and/or the operational systems 106 are also operatively connected for computer communication to the network 130. The network 130 is, for example, a data network, the Internet, a wide area network (WAN) or a local area (LAN) network. The network 130 serves as a communication medium to various remote devices (e.g., databases, web servers, remote servers, application servers, intermediary servers, client machines, other portable devices). The embodiments describing exemplary methods for clustering human trust dynamics using the system and network configuration discussed above will now be discussed in detail.

II. Methods for Clustering Human Trust Dynamics

Figure 3:
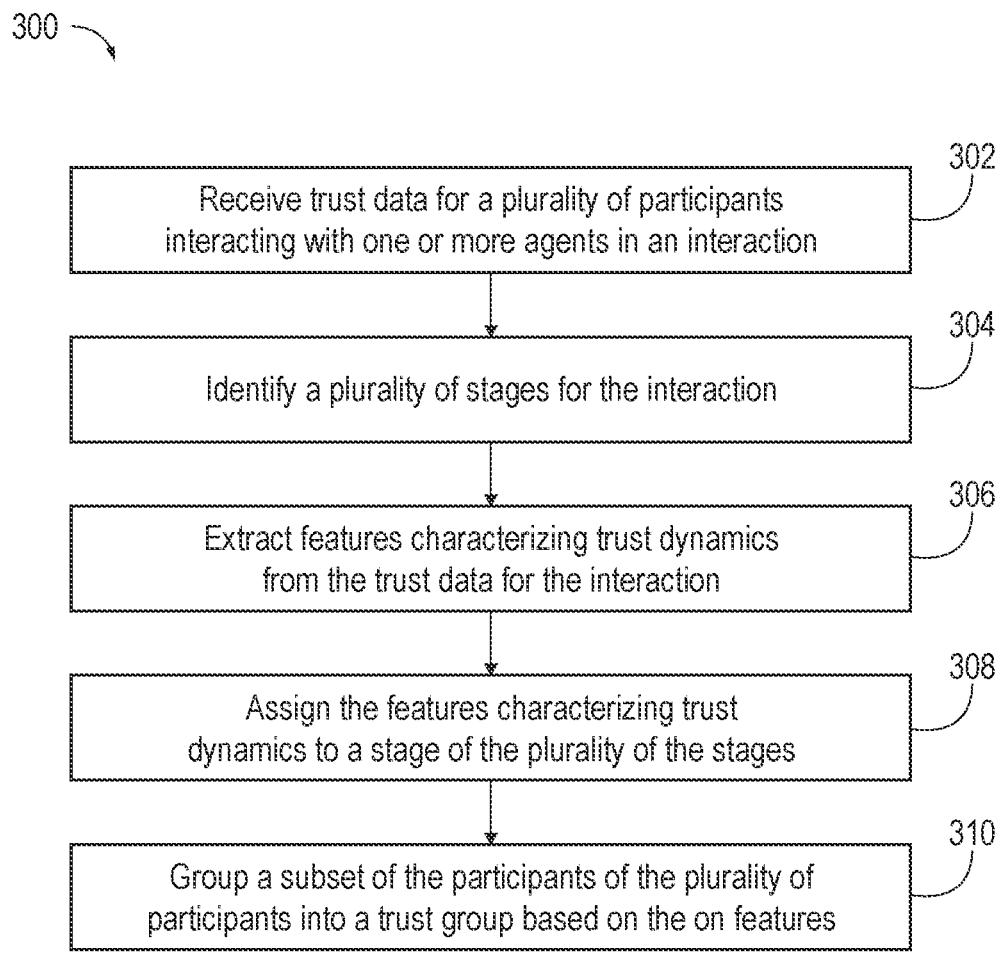
FIG. 3 is an exemplary process flow of a method for clustering human trust dynamics, according to one aspect.

Referring now to FIG. 3, a method 300 for clustering human trust dynamics will now be described according to an exemplary embodiment. FIG. 3 will also be described with reference to FIGS. 1, 2A-2C, and 4-7. For simplicity, the method 300 will be described as a sequence of elements, but it is understood that the elements of the method 300 may be organized into different architectures, blocks, stages, and/or processes.

Figure 4:
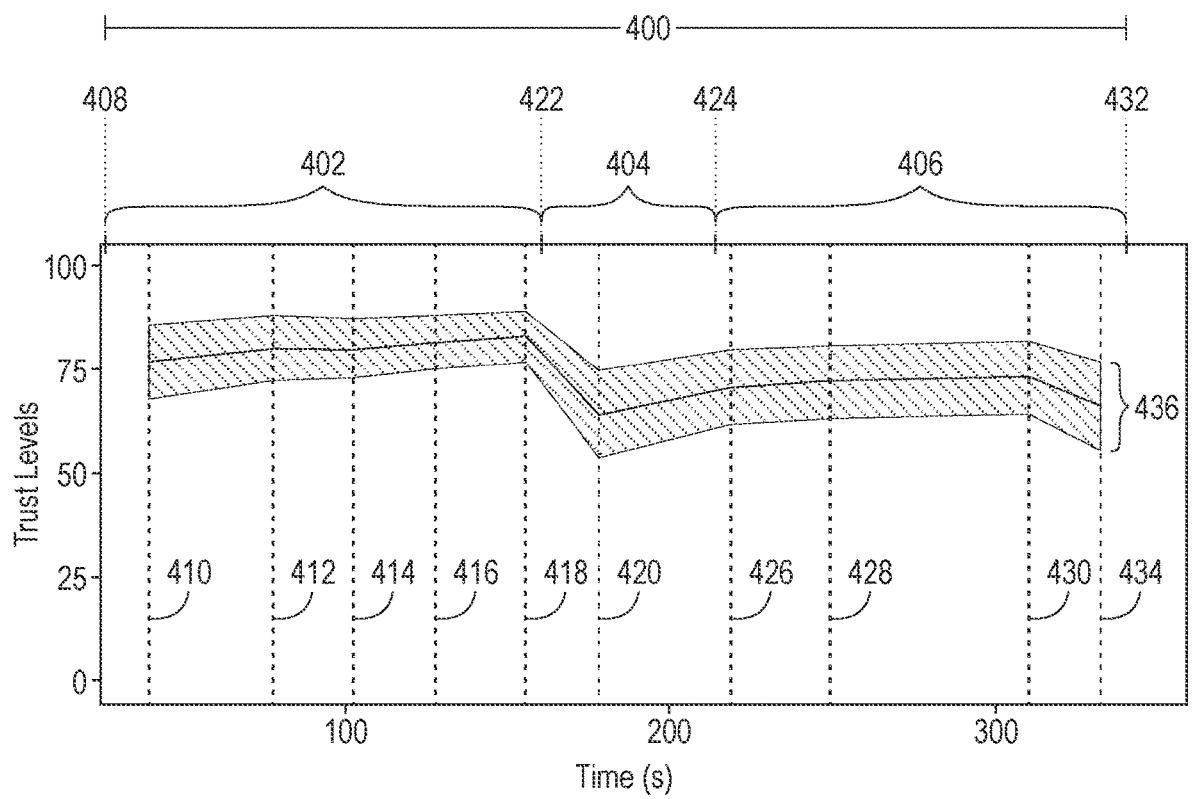
FIG. 4 is an example average trust diagram of an example participant.

At block 302, the method 300 includes the trust data module 120 receiving and/or generating trust data for a plurality of participants interacting with one or more agents in an interaction 400, shown in the timing diagram of FIG. 4. The interaction 400 is between the participant 206 and the agent 202. The interaction 400 occurs when the behaviors of the participant 206 and the agent 202 are able to affect one another. For example, in the vehicular embodiment, the interaction 400 is a driving scenario, such as driving from an origin to a destination or driving through a series of roadway configurations (e.g., intersections, roundabouts, on-ramps, exit ramps, roadways, etc.). In the vehicular embodiment, autonomous actions by the agent 202 affect the participant 206 if the participant 206 is an occupant. Likewise, the participant 206 may affect the agent 202, for example, a participant input for a hand-off takes control from the agent 202.

The trust data may include the sensor data 110 or data calculated based on the sensor data 110. For example, the trust data may include light data (e.g., radio radiation, infrared radiation, visible radiation, ultraviolet radiation, etc.) from the environment 200. The trust data may also be generated based on the sensor data 110. For example, the trust data may identify a number of objects in the environment 200 of the interaction 400 based on the light data. In one embodiment, the trust data module 120 may identify environmental characteristics, such as a crosswalk 208, signage 210, a proximate agent 212, as well as human actors. The trust data module 120 may differentiate between human actors. For example, the trust data may identify pedestrians including an adult 214 and a child, such as the pedestrian 216. The trust data may be generated from the light data using image processing techniques for detecting instances of semantic objects of a certain class.

The trust data may also be received as or generated from biometric data of the plurality of participants, such as the participant 206, among others. The trust data may also include participant inputs that indicate a trust level of the participant 206. For example, the participant 206 may be prompted to provide feedback regarding an interaction 400 with the agent 202 as self-reports that are directly related to the trust level of the participant 206. The trust data may also include participant inputs such as hand-off requests from the participant 206, which may indicate a low trust value during an operation in the interaction 400.

A hand-off request is a participant input from the participant 206 using the input interface 128, and may include a standard hand-off request or an emergency hand-off request. The standard hand-off request may cause the participant 206 to take control of the agent 202. The standard hand-off request may require that the participant 206 have direct control of the agent 202. For example, the participant 206 may be required to have their hands on a steering wheel of the agent 202. An emergency hand-off request may reduce hand-off requirements (e.g., hands on steering wheel, maintaining speed of the agent 202, etc.) to affect the handoff of the agent 202 to the participant 206 as soon as possible.

The standard hand-off request may indicate that the participant 206 has a low trust value and is concerned. The emergency hand-off request may indicate that the participant 206 has a lower trust value and is alarmed. Accordingly, the trust data may indicate if the participant input is for a standard hand-off or an emergency hand-off. Therefore, the trust data module 120 may determine a trust value for the participant 206 based on participant inputs.

At block 304, the method 300 includes identifying a plurality of phases for the interaction 400. Accordingly, the phases may be used to identify the trust level evolution of the participant 206 during the interaction 400 as a rate of change in the trust level. The plurality of phases may be predetermined. The plurality of phases may also be based on previous interactions. The plurality of phases may be determined based on predetermined time intervals or the type of interaction 400. In one embodiment, shown in FIG. 4, the plurality of phases includes a first phase 402 that is a trust building phase, a second phase 404 that is an error-awareness phase, and a third phase 406 that is a trust repair phase.

In some embodiments, the phases of the plurality of phases of the interaction 400 may be based on the reliability of operation performed by the agent 202. An operation is a task associated with achieving a goal. Operations may also include navigating a portion of a path, identifying and/or manipulating an object, etc. In the vehicular embodiment, an operation may be to traverse an intersection. The reliability of the operation may be based on visibility of the participant 206 and the sensor transparency of the agent 202.

The visibility of participant 206 is based on the ability of the participant to identify objects in the environment 200. The visibility may be determined based on the time day (e.g., day or night) and weather conditions (e.g., clear, precipitation, fog, etc.), among others. The visibility may be determined based on agent systems that identify a time day or the actuation of the agent systems, such as headlights, windshield wipers, etc. The visibility may be determined based on a range of values. For example, the features module 122 may determine the visibility as a value such as a percentage or a binary value (e.g., high or low). Referring to FIG. 2A, the environment 200 of the agent 202 is sunny without adverse weather conditions. Accordingly, FIG. 2A illustrates the environment 200 having high visibility.

FIG. 2A also illustrates high transparency. The transparency of the agent 202 is based on the communication of the agent 202 with the participant 206 to identify automation data. Automation data is data that the agent 202 has identified or determined to function. For example, the agent 202 may identify objects in the environment 200 to navigate the environment in the manner described above. The agent 202 may indicate that the agent 202 has identified objects by displaying the environment as a scene on the input interface 128 with bounding boxes, such as a bounding box 218, to indicate an identified object. Like visibility, transparency may be determined based on a range of values. The environment 200 has high transparency if the agent 202 is able to distinguish and identify objects from the environment 200 and communicate the awareness of the objects in the environment 200 to the participant 206, for example, on a display or heads-up display (HUD). Because the objects in the environment 200 of FIG. 2A are identified, the scene has high transparency.

FIG. 2B illustrates the environment 200 having high visibility and low transparency. Here, the agent 202 is unable to communicate automation data to the participant 206. For example, if the input interface 128 of the agent 202 is damaged, then even though the agent 202 is able to collect and act on automation data, the agent 202 may be unable to communicate the automation data to the participant. Accordingly, despite high visibility and the sensor 204 functioning, there may be low transparency. Likewise, if the sensor 204 is malfunctioning and the agent 202 is unable to collect and act on automation data, then there is low transparency.

FIG. 2C illustrates the environment 200 having low visibility and high transparency. For example, in FIG. 2C the environment 200 includes rain. Accordingly, the visibility is low. However, the agent 202 is able to display automation data. For example, if the sensor 204 of the agent 202 is infrared, then the adverse weather conditions do not affect the collection of the sensor data 110 of the agent. Accordingly, the agent 202 is still able to communicate automation data to the participant 206 via the input interface 128, for example, by displaying bounding boxes on the display or HUD.

Because the visibility and the transparency affect the perceived reliability of an operation for the participant 206, the phases of the plurality of phases reflect the expectations of the participant 206 when the agent 202 is attempting different types of operations. For example, in the first phase 402, the trust building phase, the participant 206 has a baseline trust level. The first phase 402 may be determined based on the reliability of operations. Turning to FIG. 4, the first phase 402 may begin at a start time 408 and continue for a number of high reliability operations. The high reliability operations may include any number of high reliability operations, for example, a first high reliability operation 410, a second high reliability operation 412, a third high reliability operation 414, a fourth high reliability operation 416, and a fifth high reliability operation 418. For example, it may be determined that the first phase 402 ends in response to the occurrence of a low reliability operation, such as a first low reliability operation 420. Therefore, the first phase 402 may extend to a first time 422 that occurs at or prior to the occurrence of the first low reliability operation 420. The first time 422 may occur at a time after the last high reliability operation, here the fifth high reliability operation 418, and before the first low reliability operation 420.

The second phase 404 is an error-awareness phase and occurs when the participant 206 encounters the first low reliability operation 420 of the automation. The second phase 404 may begin at the first time 422 and continue for one or more low reliability operations, such as the first low reliability operation 420. The second phase 404 may end at a second time 424 after the one or more low reliability operations. The second phase 404 may include a number of high reliability operations intervening in a series of low reliability operations so as to capture a set of low reliability operations. The number of intervening high reliability operations may be defined in a reliability expression. For example, the reliability expression may define that the second phase 404 continue until a last low reliability operation is followed by three or more high reliability operations. Therefore, here, the second phase 404 continues until the first low reliability operation 420 is followed by a sixth high reliability operation 426, a seventh high reliability operation 428, and an eighth reliability operation 430 according to the reliability expression.

The third phase 406 is the trust-repair phase and follows the second phase 404, the error-awareness phase during the interaction 400. The third phase 406 continues from the second time 424 to the end time 432. The third phase 406 may include a low reliability operation, such as a second low reliability operation 434, because the second low reliability operation 434 does not satisfy the reliability expression and the interaction 400 ends at the end time 432. In some embodiments, the end time 432 coincides with last operation. Here the second low reliability operation 434. In this manner, the phases are based on operations performed during the interaction 400 and may have different lengths based on the interaction 400.

At block 306, the method 300 includes the feature module 122 extracting features characterizing trust dynamics from the trust data for the interaction 400 for each participant of the plurality participants. The features may be based on objects in the environment 200 of the agent 202 and the responses of the participant 206. The features may include a baseline trust level, rate of change of trust, average trust with a pedestrian present, average trust with a pedestrian absent, average trust with a hand-off, and average trust without a hand-off, among others.

In one embodiment, extracting the features characterizing the trust dynamics includes calculating the features based on the trust data. For example, if the biometric data includes a heart rate or pulse rate reading of the participant 206 that is outside a predetermined or predefined window, the feature module 122 may determine that the participant 206 is agitated. When agitated, the feature may indicate a low trust value from the participant 206. Other ranges, windows, or thresholds for other readings or measurements may be used to characterize, identify, or define other participant mental states in a similar manner. As another example, the feature module 122 may determine that the participant 206 of the agent 202 has fallen asleep when no eye movement is detected (e.g., due to the eyes of the driver being closed) and that the participant 206 is relaxed. When relaxed, the feature may indicate a high trust value from the participant 206.

The baseline trust level may be determined based on self-reports of the participant 206 and/or demographic information of the participant 206. In some embodiments, the self-report may be received prior to the interaction 400. For example, if the participant 206 indicates, in a self-report, that the participant 206 has had a good prior experience with an agent 202 or another agent of a plurality of agents, the baseline trust level may be high. The participant 206 may report, through participant input, that the participant 206 has had poor prior experiences with an agent, such as the agent 202, resulting in a baseline trust level that is low. For example, the value associated with the baseline trust level may be a percentage or a binary value such that the baseline trust level is high or low.

The rate of change of the trust of the participant 206 is based on the trust values from the trust data. For example, the trust values associated with the operations of the interaction 400 may be used to determine the rate of change of trust of the participant 206. For example, the interaction trust 436 of a participant 206 may be calculated based on the trust values associated with each of the operations. The rate of change of trust of the participant 206 may then be calculated based on the interaction trust 436.

Although described with respect to a single participant 206 of the plurality of participants for clarity, the features characterizing trust dynamics from the trust data for the interaction are extracted for each participant of the plurality participants.

At block 308, the method 300 includes the feature module 122 assigning the features characterizing trust dynamics to a phase of the plurality of the phases. In some embodiments, the features may be assigned to phases based on the perceived reliability of the operations during the interaction 400. The trust dynamics may be assigned to the phases of the plurality of phases based on the operations. Accordingly, the phases are periods of the interaction 400 that may be compared to determine whether the trust levels of the participant are increasing or decreasing based on the variability of the operations experienced by the participant 206.

The features are assigned to the plurality of phases, to identify changes in the trust of the participants based on the experienced operations. For example, in the first phase 402, a participant 206 begins at a baseline trust level dependent on the participant input. As the shown in the interaction trust 436 of the FIG. 4, the participant 206 may increase their trust in the agent 202 as the participant 206 experiences the high reliability operations of the first phase 402. In the second phase 404, the interaction trust 436 of the participant 206 may decrease as the participant 206 encounters low reliability operations of the agent 202. In the third phase 406 the interaction trust 436 increases as the participant 206 regains trust in the agent 202 as they experience consistent high reliability operations after low reliability operations. However, some participants may not recover trust in the third phase 406 as quickly or at all.

Other features may affect in the interaction trust 436 based on the operation being performed. For example, returning to the vehicular embodiment, the presence of a pedestrian, such as the pedestrian 216 at an intersection may affect the trust of the participant 206. Accordingly, the features and/or the features as a function of trust may also be assigned to phases. In one embodiment, the features may be assigned to a phase of the plurality of phases as described in the table below:

| Phase | Feature |
| --- | --- |
| Trust-building | Initial trust level |
| | Rate of change of trust |
| | Average trust with pedestrian present |
| | Average trust with pedestrian absent |
| | Average trust with take-over |
| | Average trust with no take-over |

| | |
|---|---|
| Error-awareness | Rate of change of trust |
| Trust-repair | Rate of change of trust
Average trust with pedestrian present
Average trust with pedestrian absent
Average trust with take-over
Average trust with no take-over |

At block 310, the method 300 includes the cluster module 124 that groups a subset of the participant of the plurality of participants based on the on features characterizing trust dynamics. In one embodiment, the cluster module 124 uses a Euclidean distance-based clustering method to group the participants. Additionally, principal component analysis (PCA) may be used to reduce the number of features used for clustering. The PCA may be applied the extracted features to reduce the dimension of data and provide insights on features that contribute most to the total variation.

The clustering module may also employ a K-means clustering method to identify groups of participants with similar trust behaviors. The K-means clustering method iteratively computes each groups' centroid and updates the assignment of each sample. While converging to stable assignments, the K-means clustering method identifies the groups which minimize within-cluster variances. A predetermined number of groups is selected based on interpretability with significant statistical difference in all extracted features. The participant 206 may be assigned to the subset having participants with similar trust dynamics. Accordingly, the participant 206 can be grouped into the trust group that includes a subset of the participants of the plurality of participants that have similar features characterizing trust dynamics.

In this manner, future users can be assigned to one of a plurality of trust groups in real-time. For example, a user may be assigned to the trust group of the plurality of trust groups in response to an agent associated with the user, such as the agent 202, experiencing a predetermined number of operations. The plurality of trust groups may include a skeptical trust group and a confident trust group. The skeptical trust group may include a subset of the plurality of participants that have low or decreasing trust, for example, evidenced by the interaction trust 436. The confident trust group may correspond to high or increasing trust evidenced by the interaction trust 436. While two trust groups are described, more may be defined, for example, based on the speed of the rate of change of trust.

Figure 5:
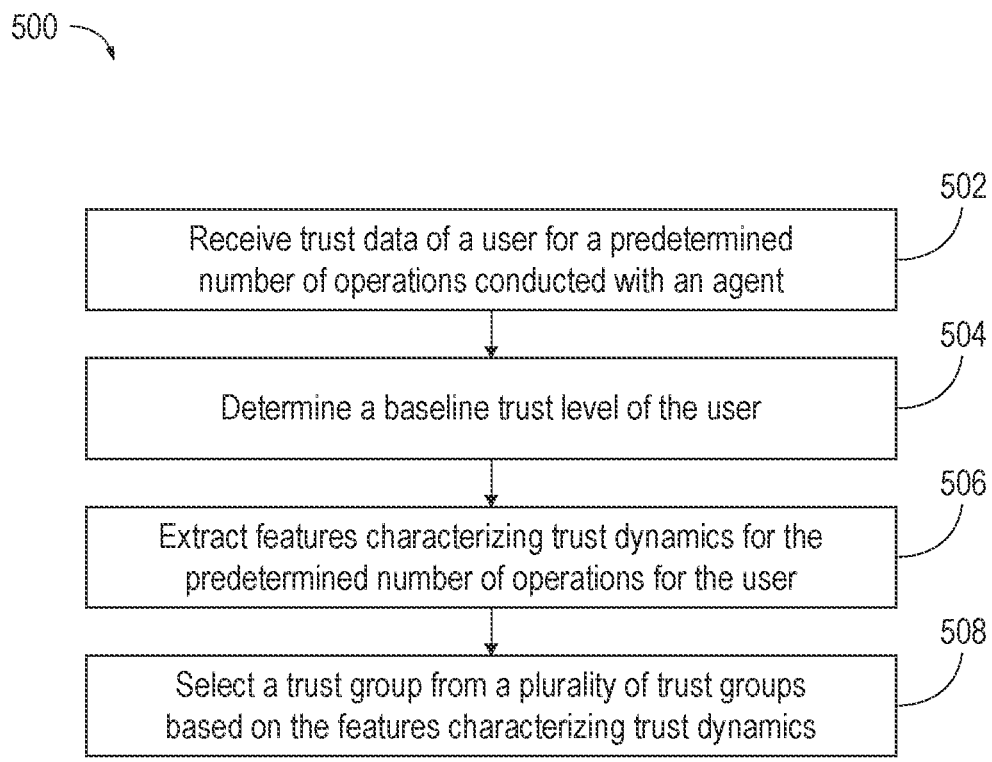
FIG. 5 is an exemplary process flow of a method for assigning a user to a trust group, according to one aspect.

Turning to FIG. 5 a method is provided for assigning a user to a trust group, according to one aspect. FIG. 5 will also be described with reference to FIGS. 1-4, 6, and 7. For simplicity, the method 500 will be described as a sequence of elements, but it is understood that the elements of the method 500 may be organized into different architectures, blocks, stages, and/or processes.

At block 502, the method 500 includes the trust data module 120 receiving trust data from a user for a predetermined number of operations conducted with an agent, such as the agent 202. The trust data is received and/or generated in a similar manner as described above with respect to the participant 206. For example, in the vehicular embodiment, the operations may include navigating a roadway configuration (e.g., intersection, roundabout, on-ramp, exit ramp, roadway, etc.). The trust data may include light data, biometric data, and user inputs, similar to participant inputs, among others as described above.

At block 504, the method 500 includes determining a baseline trust level of the user. The baseline trust level of the user is determined in a similar manner as described above with respect to the baseline trust level of the participant 206. For example, the baseline trust level may be determined based on self-reports of the user and/or demographic information of the user. The user may similarly use input data using the input interface 128. Likewise, the value associated with the baseline trust level may be a percentage or a binary value such that the baseline trust level is high or low.

At block 506, the method 500 includes extracting features characterizing trust dynamics from the trust data for the predetermined number of operations for the user. The features are extracted in a similar manner as discussed above with respect to FIG. 3. The trust data may additionally include the visibility of the user and the transparency of the agent 202, in a similar manner as described above with respect to FIGS. 2A-2C.

At block 508, the method 500 includes selecting a trust group from a plurality of trust groups based on the features characterizing trust dynamics. In particular, the plurality of features may be used to predict the user's trust level. In one embodiment, the prediction may be based on a state space (SS) model with a Kalman Filter. In particular, a linear time-invariant state-space model with a sigmoid output function may map the state of trust to the prediction as output. Extracted features, such as visibility, transparency, pedestrian presence, and reliability, may be inputs of the SS model. An extended Kalman filter that accommodates the nonlinear sigmoid output function may be used to update the state prediction of trust. The trust group of the plurality trust groups may be selected for the user based on the prediction.

The systems and methods for clustering human trust dynamics, described herein, provide a trust dynamics-based clustering framework to identify and develop customized trust models based on participant trust behavior. The systems and methods balance the tradeoff between a single general model of human trust or several personalized models of human trust. The customized models developed based on these clusters outperform general one-fit models in predicting human trust and hand-off behavior during interaction with an agent 202. Accordingly, the agent 202 can anticipate the actions of the participant 206, such that the agent 202 can modify behaviors to improve the automated responses of the agent 202. In this manner, the automation technologies of the agent 202 are improved, which may also improve the experience of the participant 206.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims. Furthermore, limited trust data from a predetermined number of operations from a user can be used to determine the cluster to which the user belongs to and accordingly utilize the pre-trained customized models and policies for the given cluster. This allows ease of deployment in commercial settings without the need to retrain the models for personalization.

Figure 6:
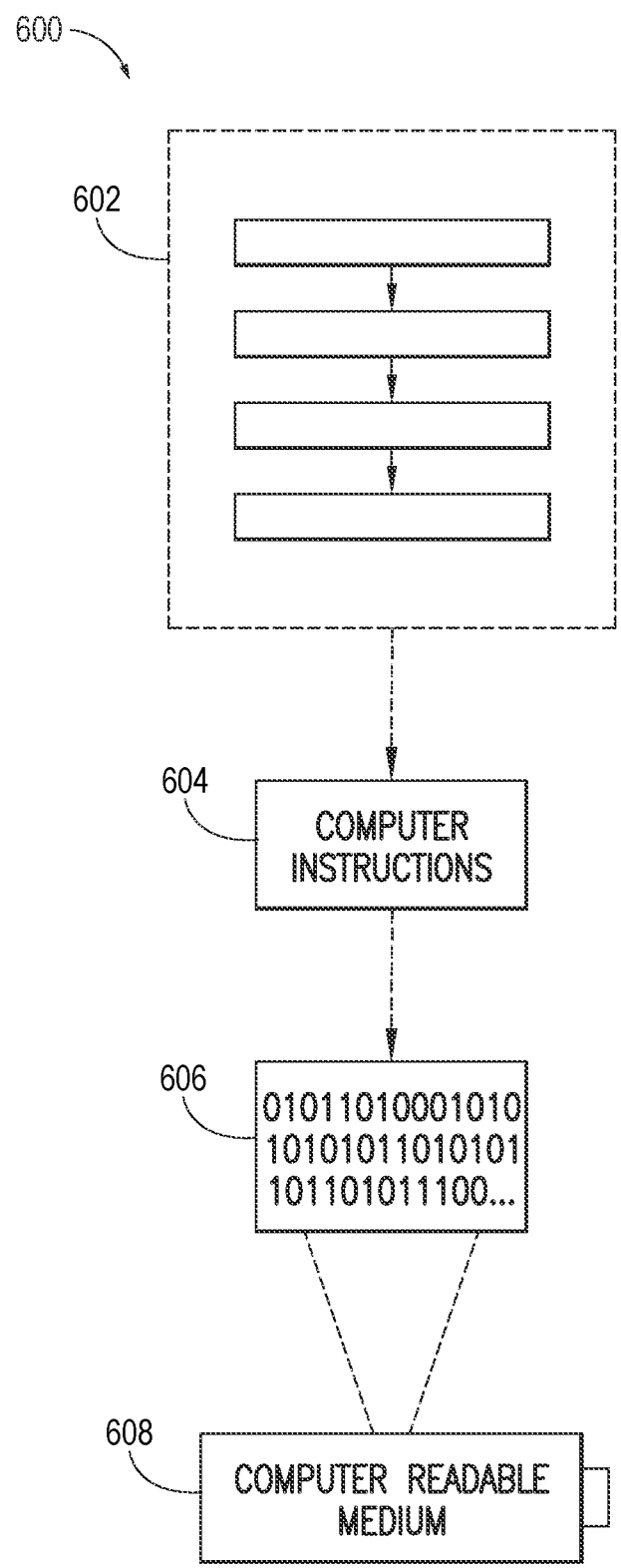
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3 and/or the method 500 of FIG. 5. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
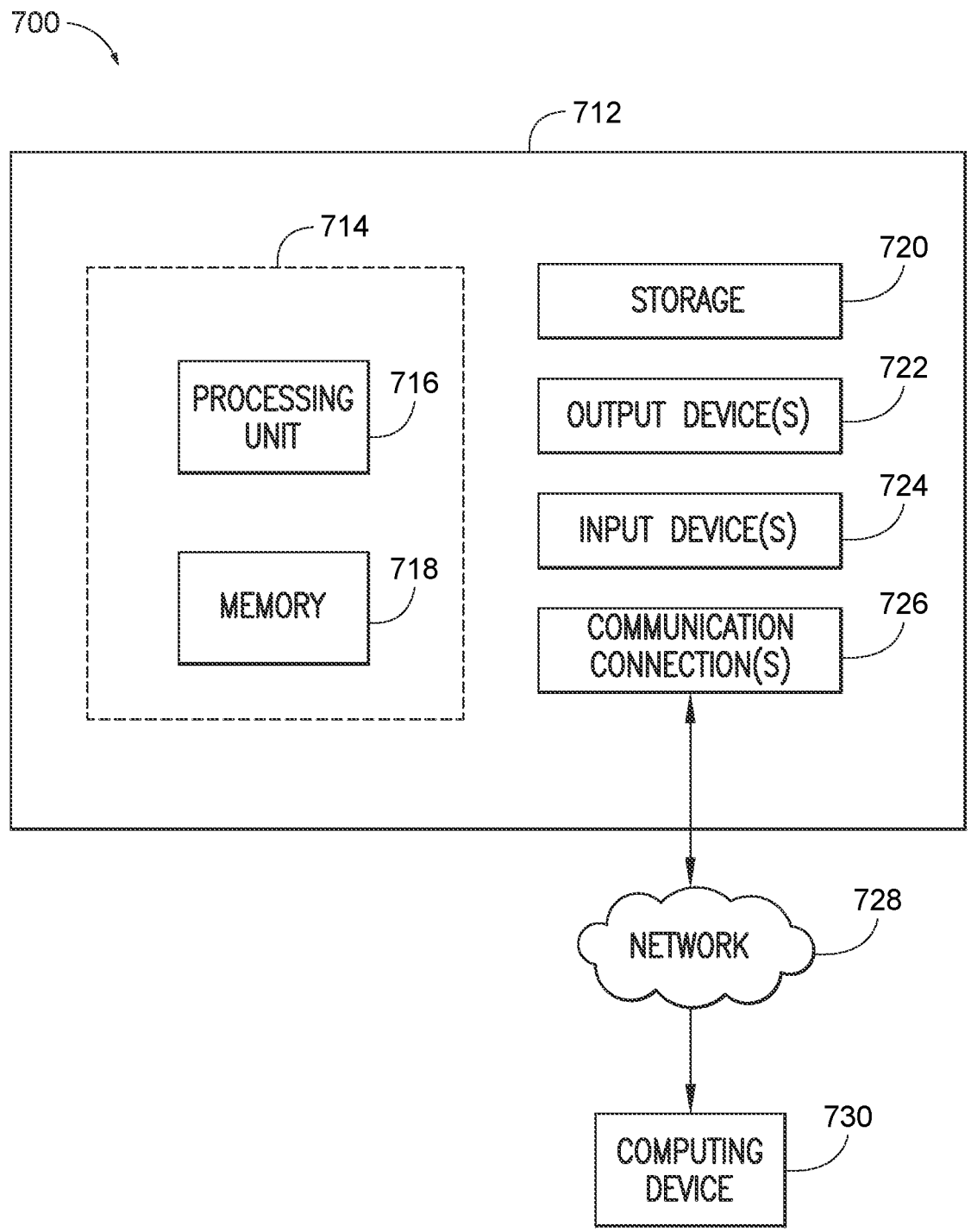
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including an apparatus 712 configured to implement one aspect provided herein. In one configuration, the apparatus 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the apparatus 712 includes additional features or functionality. For example, the apparatus 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 712. Any such computer storage media is part of the apparatus 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 712 includes input device(s) 724 such as keyboard, mouse, pen, voice input device, touch input device, infrared cameras, video input devices, or any other input device. Output device(s) 722 such as one or more displays, speakers, printers, or any other output device may be included with the apparatus 712. Input device(s) 724 and output device(s) 722 may be connected to the apparatus 712 via a wired connection, wireless connection, or any combination thereof. In one aspect, an input device or an output device from another computing device may be used as input device(s) 724 or output device(s) 722 for the apparatus 712. The apparatus 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented method for clustering human trust dynamics comprising:
   sensing environmental conditions of one agent of one or more agents, and biometrics of each participant of a plurality of participants interacting with the one agent of the one or more agents;
   receiving trust data including sensor data from the sensor for each participant of the plurality of participants interacting with the one agent of the one or more agents in an interaction;
   identifying a plurality of phases for the interaction;
   extracting features characterizing trust dynamics from the trust data for the interaction for each participant of the plurality of participants, wherein the interaction is between the participant and one agent of the one or more agents, wherein the features characterizing trust dynamics include environmental data and corresponding biometric data;
   assigning the features characterizing the trust dynamics to a phase of the plurality of the phases;
   grouping a subset of the participants of the plurality of participants into a trust group based on the features characterizing the trust dynamics; and
   modifying behavior of the one agent of the one or more agents based on the trust group of a given participant of the plurality of participants.

2. The computer implemented method of claim 1, wherein the features characterizing trust dynamics include a rate of change of trust of the participant.

3. The computer implemented method of claim 1, wherein the features characterizing trust dynamics are based on a number of environmental characteristics at a location of the interaction.

4. The computer implemented method of claim 3, wherein the location is a crosswalk, and wherein the environmental characteristics include pedestrians present at the crosswalk and the pedestrians absent at the crosswalk.

5. The computer implemented method of claim 1, wherein the features characterizing trust dynamics are based on a behavior of a participant.

6. The computer implemented method of claim 1, wherein the plurality of phases includes a trust building phase, an error-awareness phase, and a trust repair phase.

7. The computer implemented method of claim 1, further comprising:
   predicting behavior of a participant based on the trust group of the participant, and
   determining an action of an agent of the one or more agents based on the predicted behavior of the participant.

8. A system of an agent for clustering human trust dynamics comprising:
   one or more sensors sensing environmental conditions of one agent of one or more agents, and biometrics of each participant of a plurality of participants interacting with the one agent of the one or more agents;
   a memory storing instructions that when executed by a processor cause the processor to:
      receive trust data including sensor data from the sensor for each participant of the plurality of participants interacting with the one agent of the one or more agents in an interaction and identify a plurality of phases for the interaction;
      extract features characterizing trust dynamics from the trust data for the interaction for each participant of the plurality of participants and assign the features characterizing trust dynamics to a phase of the plurality of the phases, wherein the interaction is between the participant and the one agent of the one or more agents, wherein the features characterizing trust dynamics include environmental data and corresponding biometric data;
      group a subset of the participants of the plurality of participants into a trust group based on the features characterizing trust dynamics; and
      modify behavior of the one agent of the one or more agents based on the trust group of a given participant of the plurality of participant.

9. The system of claim 8, wherein the features characterizing trust dynamics include a rate of change of trust of the participant.

10. The system of claim 8, wherein the features characterizing trust dynamics are based on a number of environmental characteristics at a location of the interaction.

11. The system of claim 10, wherein the location is a crosswalk, and wherein the environmental characteristics include pedestrians present at the crosswalk and the pedestrians absent at the crosswalk.

12. The system of claim 8, wherein the features characterizing trust dynamics are based on a behavior of a participant.

13. The system of claim 8, wherein the plurality of phases includes a trust building phase, an error-awareness phase, and a trust repair phase.

14. The system of claim 8, wherein the instructions further cause the processor to:
   predict behavior of a participant based on the trust group of the participant, and
   determine an action of an agent of the one or more agents based on the predicted behavior of the participant.

15. A non-transitory computer readable storage medium storing instructions that when executed by a computer having a processor to perform a method for clustering human trust dynamics, the method comprising:

sensing environmental conditions of one agent of one or more agents, and biometrics of each participant of a plurality of participants interacting with the one agent of the one or more agents;

receiving trust data including sensor data from the sensor for each participant of the plurality of participants interacting with the one agent of the one or more agents in an interaction;

identifying a plurality of phases for the interaction;

extracting features characterizing trust dynamics from the trust data for the interaction for each participant of the plurality of participants, wherein the interaction is between the participant and one agent of the one or more agents, wherein the features characterizing trust dynamics include environmental data and corresponding biometric data;

assigning the features characterizing trust dynamics to a phase of the plurality of the phases;

grouping a subset of the participants of the plurality of participants into a trust group based on the features characterizing trust dynamics; and modifying behavior of the one agent of the one or more agents based on the trust group of a given participant of the plurality of participant.

16. The non-transitory computer readable storage medium implemented method of claim 15, wherein the features characterizing trust dynamics include a rate of change of trust of the participant.

17. The non-transitory computer readable storage medium implemented method of claim 15, wherein the features characterizing trust dynamics are based on a number of environmental characteristics at a location of the interaction.

18. The non-transitory computer readable storage medium implemented method of claim 17, wherein the location is a crosswalk, and wherein the environmental characteristics include pedestrians present at the crosswalk and the pedestrians absent at the crosswalk.

19. The non-transitory computer readable storage medium implemented method of claim 15, wherein the features characterizing trust dynamics are based on a behavior of a participant.

20. The non-transitory computer readable storage medium implemented method of claim 15, wherein the plurality of phases includes a trust building phase, an error-awareness phase, and a trust repair phase.

* * * * *